(No Model.)   H. W. MARTIN.   2 Sheets—Sheet 1.
FISHING REEL.
No. 479,440.   Patented July 26, 1892.
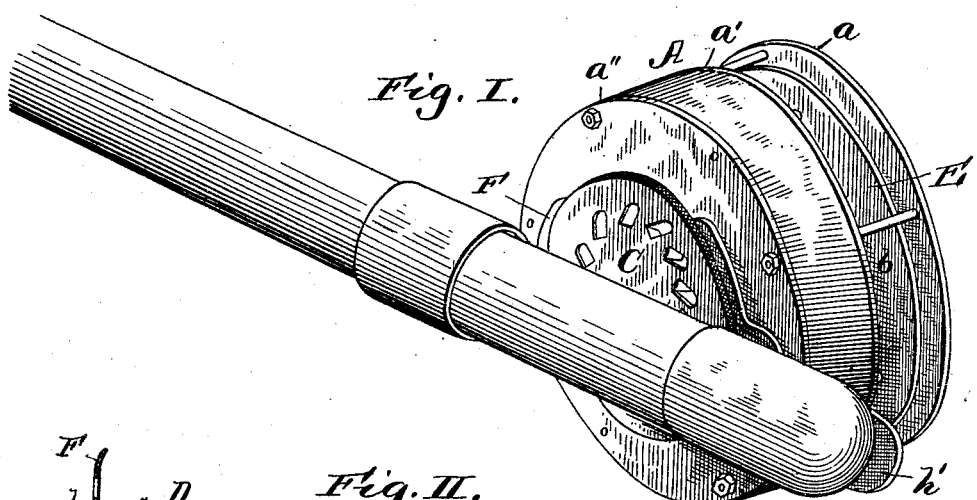
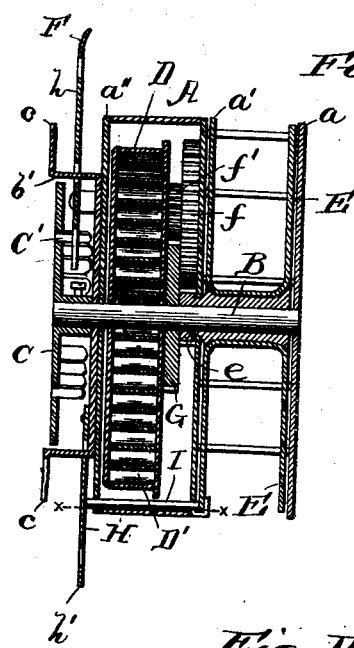
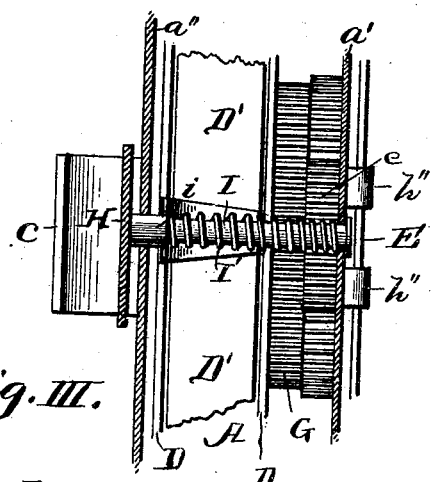
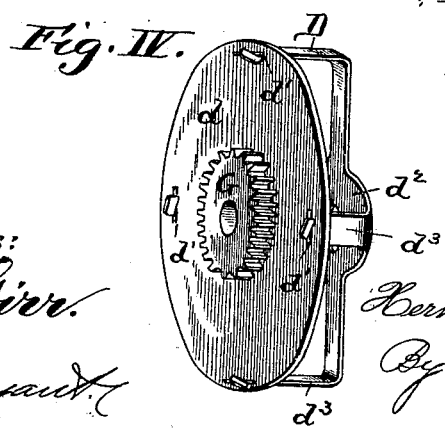
Witnesses:
J. B. McGirr.
Arthur L. Bryant
Inventor.
Herman W. Martin
By Edson Bros.
Attys.

(No Model.)  2 Sheets—Sheet 2.
H. W. MARTIN.
FISHING REEL.
No. 479,440.  Patented July 26, 1892.
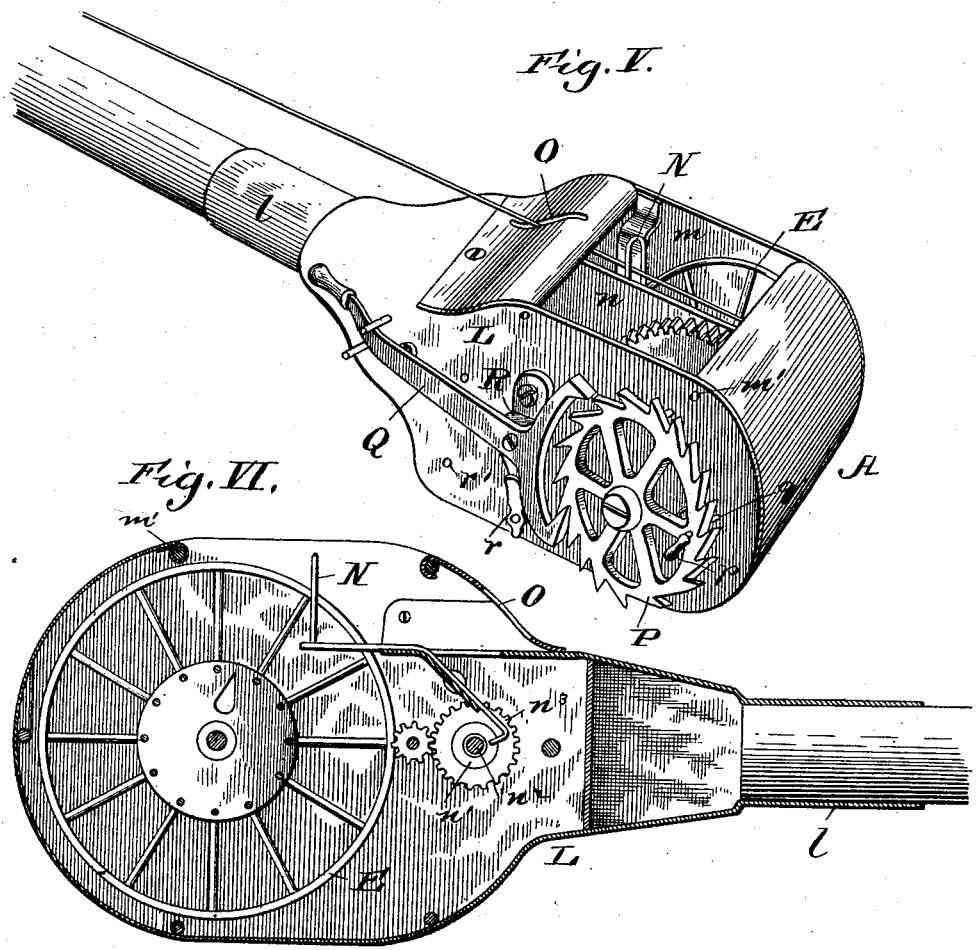
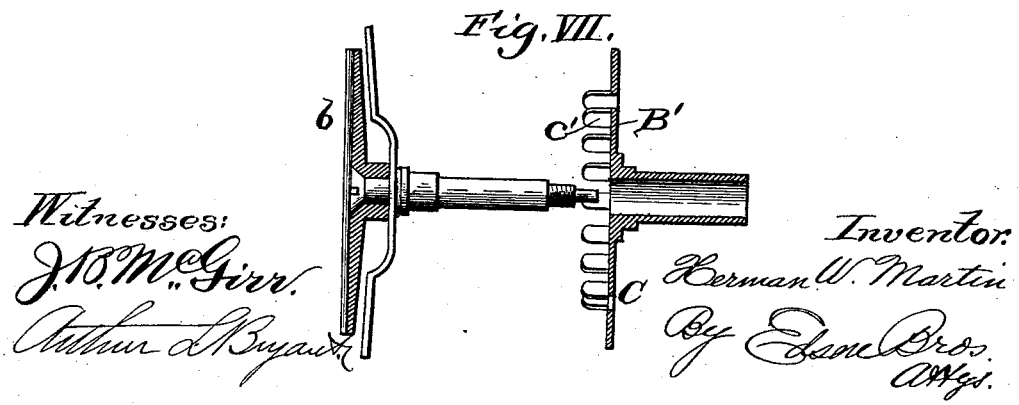
Witnesses:  Inventor:
Herman W. Martin
By Edson Bros.
Attys.

UNITED STATES PATENT OFFICE.

HERMAN W. MARTIN, OF ILION, NEW YORK, ASSIGNOR TO FRANCES I. MARTIN, OF SAME PLACE.

FISHING-REEL.

SPECIFICATION forming part of Letters Patent No. 479,440, dated July 26, 1892.

Application filed May 6, 1891. Serial No. 391,826. (No model.)

*To all whom it may concern:*

Be it known that I, HERMAN W. MARTIN, a citizen of the United States, residing at Ilion, in the county of Herkimer and State of New York, have invented certain new and useful Improvements in Fishing-Reels; and I do hereby declare the following to be a full, clear, and exact description of the invention, such as will enable others skilled in the art to which it appertains to make and use the same.

My invention relates to improvements in fishing-reels; and the objects are, first, to provide a simple and effective automatic reel by which the tension of the mainspring can be easily varied and regulated by the operator, and, second, to provide a reel which can be operated from the side adjacent to the pole on which the reel is fitted instead of from the opposite side, as is customary in the devices at present in use.

With these ends in view my invention consists in the combination, with a reel-casing, a line-spool, and a spring, of a hand-operated winding-wheel arranged closely adjacent to one side of the reel-casing, exteriorly thereto, and connected through intermediate devices with the spring-barrel, whereby when the reel is applied to a fishing-rod the winding-wheel is placed between the reel and said rod, thus enabling the fisherman to operate the reel with ease and obviating the liability of injury to the hands or the rapid uncoiling of the spring which with the crank-wound reels is sometimes caused by the crank striking the hands.

My invention further consists in the winding-wheel, provided with a series of lateral lips or pins, preferably made integral with the wheel or disk by stamping and pressing the metal at right angles to the plane of the disk, combined with a verge or pallet pivoted to the outer side of the reel case or shell and engaging with the lips or pins to enable the operator to manually release the tension of the spring when desired.

My invention further consists in the combination, with a spring-barrel, of the inclosing shell or casing, a line-spool fitted loosely on the central reel-shaft and arranged to be put under tension from the spring-barrel through a train of gears intermediate of the line-spool and said spring-barrel, and a novel brake for arresting the rotations of the line-spool when desired.

My invention further consists in the novel construction and arrangement of parts and combination of devices, as will be hereinafter more fully described and claimed.

To enable others to more readily understand my invention, I have illustrated the same in the accompanying drawings, in which—

Figure I is a perspective view. Fig. II is a transverse sectional view through the same. Fig. III is an enlarged detail view of the braking mechanism on the line $x \, x$ of Fig. II. Fig. IV is a detail perspective view of the barrel for holding the coiled spring. Fig. V is a perspective view of a modified form of my invention especially designed for deep-water fishing. Fig. VI is a vertical sectional view through the same. Fig. VII is a detail sectional view of a modification.

Like letters of reference denote corresponding parts in the several figures of the drawings, referring to which, and particularly to Figs. I to IV, inclusive, A designates the outer inclosing case or shell of my reel, which consists of three pillar plates or disks $a \, a' \, a''$, connected together by a series of posts or rods $b$. A saddle $b'$ is arranged at one side of the casing A and is rigidly attached to or made integral with said casing, and the ends of the saddle are bent to form ears $c$, adapted to bear against the side of the fishing rod or pole and to be secured in position thereon by suitable sleeves or rings in the usual manner. A shaft B extends centrally through the casing A and is journaled in the outer pillar-plates $a \, a''$ thereof, and to the end of this shaft nearest the pole and between said pole and the casing of the reel is attached a hand-operated winding wheel or disk C. This disk or wheel is provided with a series of integral teeth or pins $C'$, which are pressed or stamped out of the metal of which the wheel is made, which teeth extend from said wheel or disk toward the casing A of the wheel. A suitable barrel D is fitted loosely around the shaft B within the casing A. The spring-barrel is constructed in a novel manner to enable the ready removal of an old, broken, or injured spring and its replacement by another good spring. The barrel consists of a plate $d$, having a series of apertures $d'$ near its periphery, and another plate $d^2$, provided with integral posts $d^3$, which are notched at their free ends for insertion into the apertures $d'$, whereby the ends of the posts below the notches can be bent after they have been fitted in the apertures to fasten the posts and plate $d^2$ to the plate $d$. By this construction the plates can be readily separated to permit ready access to the spring, and thus enable it to be replaced by a new spring.

Between the plates $a'\ a''$ of the reel-casing is a coiled spring D', one end of which is connected to the interior of the barrel D. It will be noticed that the plates $a'\ a''$ completely inclose the upper and lower sides of the barrel D and prevent the water or moisture from getting into the same to injure and damage the coiled spring therein.

Around the central shaft B and between the plates $a\ a'$ of the casing A is arranged the line-spool E, and to one side of said spool is attached a pinion $e$, which when the parts are secured together extends through a central aperture in the intermediate pillar-plate $a'$ around the shaft B and which meshes with a gear-wheel $f$, supported on a short stud attached to said pillar-plate $a'$. This gear-wheel $f$ has secured to one side a gear-pinion $f'$, which meshes with a gear-wheel G, attached to the lower side of the spring-barrel D.

A pallet or verge F is pivoted to the outer side of the pillar-plate $a''$ of the casing A, and it is arranged between the wheel or disk C and the plate $a'$. This pallet engages with the pins or teeth C' on the wheel or disk C, and it is slotted to allow one of the ears $c$ to pass through, said pallet being also provided with a handle or thumb-piece $h$, by which it can be manually operated. Opposite to the thumb or operating piece of the pallet I provide the brake H, which is pivoted to the outer side of the pillar-plate $a''$ of the casing A and is also provided with a slot to permit of the passage of one of the attaching-ears $c$. The brake H is also provided with a thumb-piece $h'$. The ear $c$, around which the brake H passes, is provided in one of its vertical edges with a notch, in which the edge of the brake can be forced. A pin I extends through the plates $a''\ a'$, and the head of this pin contacts with or presses against the surface of the line-spool, and the other end of such pin extends a short distance beyond the outer surface of the pillar-plate $a''$. A coiled spring I' is arranged around this pin I, between a flange $i$, formed thereon, and the pillar-plate $a'$. By depressing the brake H by means of its thumb-piece $h'$ the pin I forces the line-spool against two overhanging lips $h''$ on the upper or outer surface of the pillar-plate $a'$, and the line-spool is thus held between the head of the pin I and the ears $h''$.

The operation of my invention may be stated as follows: By operating the pallet F manually to let off the tension-spring and forcing the edge of the brake into the notch in the ear $c$ the operator has a free and open reel to be used in casting. The operator then simply presses on the thumb-piece of the brake to remove the same from the notch in the ear $c$ and force the pin I into contact with the line-spool, and then the spring is wound to any desired tension by turning the wheel or disk C, which operates to turn the shaft B, the line-spool and train of gears being prevented from movement by the brake. When a fish is caught, the line is wound on said spool by the action of the spring. Should the fish exert a greater pull on the line than the force of the spring, the line-spool will revolve to allow the line to run out, and any slack that may occur in the line is instantly taken up by the recoil of the spring. The strength of the reel depends on the size of the spring. When the operator is through fishing, the spring is let down or unwound by operating the pallet F, and the reel is thus made perfectly harmless.

In Figs. V and VI of the drawings I have illustrated a modification of my invention especially adapted for black-bass and blue-fish fishing—in fact, for all deep-water fishing. The reel in this case is designed to be attached to the butt-end of a pole instead of on the side of the pole, as heretofore described. In this form of reel one side of the casing L is made with the integral ferrule or socket $l$, and the other two sides $m\ n$ of the inclosing case or shell are held in position by posts or rods $m'$. The interior of this reel is the same as that heretofore described, except that the line-spool is made wider to accommodate a greater length of line and a guide N is pivoted within the inclosing shell near the upper end thereof. The rear end of this line-guide contacts with a cam $n'$ on a transverse shaft $n^2$, which has attached thereto a gear-wheel $n^3$, which meshes with the train of gears for operating the line-spool. The shaft $n^2$ is revolved through the train of gears and the spur-wheel $n^3$, and the cam thereon contacts with the upper or rear end of the line-guide and causes the forward end thereof to move back and forth across the width of the line-spool. After passing through the guide N the line passes through a slot O in the outer inclosing shell. In this construction of reel I preferably make the winding-wheel P toothed or serrated on its periphery instead of providing it with a series of pins or stops, as hereinbefore described. To one of the spokes or arms of the wheel P is attached a handle $p$, which is so constructed that it can be depressed to take into any one of a series of perforations $q$, formed in the inclosing case or shell of the reel to lock the wheel P firmly in place and render the reel automatic. The pallet or verge Q is pivoted to a spring-plate R, which plate is in turn pivoted near one end to the shell of the reel, and the other end of said spring-plate is provided on its lower side with a short stud or pin adapted to take into one of two perforations $r\ r'$, according as it is desired to have the pallet engage with or to be free from the wheel P.

In Fig. VII, I have shown a modification of the winding mechanism in which the central shaft is fixed or stationary and the winding-wheel is secured to a sleeve B', fitted loosely around the central fixed shaft. In this form the spring-barrel is fitted loosely around the sleeve B', and one end of the spring D' therein is connected to said sleeve. The operation in this form is similar to that heretofore described, the spring being wound by rotating the sleeve B' and the spring-barrel revolving around said sleeve and the stationary central shaft. In this modification, however, the pins or teeth C' on the wheel or disk C are formed on the side of said wheel opposite from the casing of the reel, or, in other words, on the side of the disk or wheel adjacent to the pole.

I am aware that changes in the form and proportion of parts and details of construction of the devices herein shown and described as an embodiment of my invention can be made without departing from the spirit or sacrificing the advantages thereof, and therefore reserve the right to make such changes as fairly fall within the scope of my invention.

Having thus described my invention, what I claim as new, and desire to secure by Letters Patent, is—

1. In a fishing-reel, the combination, with an inclosing shell, of a shaft journaled therein, a spring-barrel having a coiled spring therein, a line-spool arranged within the inclosing shell, a train of gears intermediate of the spring-barrel and the line-spool, and a winding wheel or disk attached to one end of the shaft and arranged closely adjacent to said reel, substantially as shown and described, for the purpose specified.

2. In a fishing-reel, the combination, with an inclosing shell or case, of a shaft journaled therein, a coiled spring fitted in a suitable barrel arranged in a chamber of said shell and connected at one end with the shaft, a line-spool fitted loosely around the shaft in another chamber of the reel, a train of gears connecting the spring-barrel and the line-spool, a winding wheel or disk secured to one end of the shaft and provided with a series of stops or pins, and a pallet pivoted on the inclosing shell and engaging with the stops or pins on said wheel, substantially as and for the purpose specified.

3. In a fishing-reel, the combination, with an inclosing case or shell adapted to be secured on a pole, of a central shaft journaled therein, a coiled spring arranged in a suitable barrel which is fitted loosely on the central shaft, a line-spool fitted loosely on the central shaft, a train of gears intermediate of the spring, containing the barrel and the line-spool, a winding-wheel attached to the end of the central shaft, arranged closely adjacent to the inclosing shell of the reel, a pallet pivoted to the inclosing shell and engaging with the winding-wheel, and a brake fulcrumed on the side of the reel and contacting with the line-spool, substantially as shown and described, for the purpose specified.

4. In an automatic fishing-reel, the combination of a line-spool, a brake-plate fulcrumed on the outer shell of the reel, and a brake pin or rod arranged between the brake-plate and line-spool and adapted to be moved longitudinally against the side of said line-spool, substantially as described.

5. In a fishing-reel, the combination, with an outer shell, a spring and its barrel, and a line-spool, of a winding-wheel arranged laterally of the shell, close to the side thereof, and geared to the spring-barrel, substantially as described.

6. In a fishing-reel, the combination, with an outer shell, a spring-drum containing a spring, and a line-spool, of a winding-wheel having the integral lips or flanges struck up from the metal plate forming the wheel and a verge or pallet pivoted to the reel case or shell and engaging with the lips of the winding-wheel, substantially as described.

7. In a fishing-reel, the separable spring-drum comprising the flat perforated disk or plate and another plate having integral posts fitted in the apertured plate and secured thereto, substantially as described.

8. In a fishing-reel, the casing or shell comprising the outer pillar-plates and the intermediate pillar-plate having the enlarged central aperture, all of said plates being rigidly fastened together, combined with a central shaft, a line-spool fitted closely on said shaft between the central pillar-plate and one of the outer pillar-plates and having a hollow gear-stud passing through the aperture in the central pillar-plate, the spring-drum arranged between said central pillar-plate and the outer plate and having a gear or pinion meshing with the gear-stud of the line-spool by an intermediate gear mounted on the central pillar-plate, and the winding-wheel rigid with the shaft exteriorly of the casing, substantially as described.

In testimony whereof I affix my signature in presence of two witnesses.

HERMAN W. MARTIN.

Witnesses:
FRANK S. HOEFLER,
J. P. OGDEN.